United States Patent
Ridel et al.

(10) Patent No.: US 9,554,418 B1
(45) Date of Patent: Jan. 24, 2017

(54) DEVICE FOR TOPOLOGY HIDING OF A VISITED NETWORK

(71) Applicant: F5 Networks, Inc., Seattle, WA (US)

(72) Inventors: Leonid Ridel, Hod HaSharon (IL); Petro Flomin, Herzelia (IL)

(73) Assignee: F5 Networks, Inc., Seattle, WA (US)

( * ) Notice: Subject to any disclaimer, the term of this patent is extended or adjusted under 35 U.S.C. 154(b) by 184 days.

(21) Appl. No.: 14/194,277

(22) Filed: Feb. 28, 2014

Related U.S. Application Data

(60) Provisional application No. 61/770,466, filed on Feb. 28, 2013.

(51) Int. Cl.
*H04B 7/00* (2006.01)
*H04W 84/04* (2009.01)

(52) U.S. Cl.
CPC .................. *H04W 84/042* (2013.01)

(58) Field of Classification Search
None
See application file for complete search history.

(56) References Cited

U.S. PATENT DOCUMENTS

| | | |
|---|---|---|
| 4,993,030 A | 2/1991 | Krakauer et al. |
| 5,218,695 A | 6/1993 | Noveck et al. |
| 5,303,368 A | 4/1994 | Kotaki |
| 5,410,667 A | 4/1995 | Belsan et al. |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

Debnath, Biplob et al., "ChunkStash: Speeding up inline Storage Deduplication using Flash Memory," USENIX Annual Technical Conference, 2010, pp. 1-16, usenix.org.

(Continued)

*Primary Examiner* — Kwang B Yao
*Assistant Examiner* — Juvena Loo
(74) *Attorney, Agent, or Firm* — LeClairRyan, a Professional Corporation

(57) ABSTRACT

A system for hiding an internal topology of a network having plurality of client and server entities is provided herein. The system comprises a topology hiding node that coordinates communication between systems in two distinct networks: Home Public Land Mobile and Visited Public Land Mobile. The topology hiding node includes long term storage and a short term storage which includes a change list.
A real identity of one system entity is represented by at least one virtual identity allocated from a group of at least two virtual identities, when communicating with the other system entities, and the relation between the virtual identities and the real identities of a current communication session is recorded in the change list and stored in short term storage and the relation between the virtual identities and the real identities of a previous communication sessions is stored in the long term storage.

18 Claims, 5 Drawing Sheets

(56) References Cited

U.S. PATENT DOCUMENTS

| | | |
|---|---|---|
| 5,586,260 A | 12/1996 | Hu |
| 5,590,320 A | 12/1996 | Maxey |
| 5,623,490 A | 4/1997 | Richter et al. |
| 5,644,698 A | 7/1997 | Cannon |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Beri et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,088,759 A | 7/2000 | Hasbun et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,182,188 B1 | 1/2001 | Hasbun et al. |
| 6,202,071 B1 | 3/2001 | Keene |
| 6,202,156 B1 | 3/2001 | Kalajan |
| 6,223,206 B1 | 4/2001 | Dan et al. |
| 6,226,759 B1 | 5/2001 | Miller et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,311,290 B1 | 10/2001 | Hasbun et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,370,543 B2 | 4/2002 | Hoffert et al. |
| 6,374,263 B1 | 4/2002 | Bunger et al. |
| 6,374,336 B1 | 4/2002 | Peters et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,697,871 B1 | 2/2004 | Hansen |
| 6,704,755 B2 | 3/2004 | Midgley et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,757,706 B1 | 6/2004 | Dong et al. |
| 6,760,337 B1 | 7/2004 | Snyder, II et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Kar et al. |
| 6,850,997 B1 | 2/2005 | Rooney et al. |
| 6,868,439 B2 | 3/2005 | Basu et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,912 B2 | 2/2006 | Loisey et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,024,427 B2 | 4/2006 | Bobbitt et al. |
| 7,039,061 B2 | 5/2006 | Connor et al. |
| 7,051,112 B2 | 5/2006 | Dawson |
| 7,054,998 B2 | 5/2006 | Arnott et al. |
| 7,055,010 B2 | 5/2006 | Lin et al. |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,181,523 B2 | 2/2007 | Sim |

(56) References Cited

U.S. PATENT DOCUMENTS

| | | |
|---|---|---|
| 7,194,579 B2 | 3/2007 | Robinson et al. |
| 7,197,615 B2 | 3/2007 | Arakawa et al. |
| 7,206,863 B1 | 4/2007 | Oliveira et al. |
| 7,216,264 B1 | 5/2007 | Glade et al. |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,243,089 B2 | 7/2007 | Becker-Szendy et al. |
| 7,243,094 B2 | 7/2007 | Tabellion et al. |
| 7,263,610 B2 | 8/2007 | Parker et al. |
| 7,269,168 B2 | 9/2007 | Roy et al. |
| 7,269,582 B2 | 9/2007 | Winter et al. |
| 7,272,613 B2 | 9/2007 | Sim et al. |
| 7,272,654 B1 | 9/2007 | Brendel |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,299,250 B2 | 11/2007 | Douceur et al. |
| 7,308,475 B1 | 12/2007 | Pruitt et al. |
| 7,330,486 B2 | 2/2008 | Ko et al. |
| 7,343,398 B1 | 3/2008 | Lownsbrough |
| 7,346,664 B2 | 3/2008 | Wong et al. |
| 7,383,288 B2 | 6/2008 | Miloushev |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,418,439 B2 | 8/2008 | Wong |
| 7,437,358 B2 | 10/2008 | Arrouye et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,496,367 B1 | 2/2009 | Ozturk et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,620,775 B1 | 11/2009 | Waxman |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,656,788 B2 | 2/2010 | Ma et al. |
| 7,680,836 B2 | 3/2010 | Anderson et al. |
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kirnos et al. |
| 7,734,603 B1 | 6/2010 | McManis |
| 7,739,540 B2 | 6/2010 | Akutsu et al. |
| 7,743,031 B1 | 6/2010 | Cameron et al. |
| 7,743,035 B2 | 6/2010 | Chen et al. |
| 7,752,294 B2 | 7/2010 | Meyer et al. |
| 7,788,335 B2 | 8/2010 | Miloushev et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,889,734 B1 | 2/2011 | Hendel et al. |
| 7,900,002 B2 | 3/2011 | Lyon |
| 7,903,554 B1 | 3/2011 | Manur et al. |
| 7,904,466 B1 | 3/2011 | Valencia et al. |
| 7,913,053 B1 | 3/2011 | Newland |
| 7,937,421 B2 | 5/2011 | Mikesell et al. |
| 7,953,085 B2 | 5/2011 | Chang et al. |
| 7,953,701 B2 | 5/2011 | Okitsu et al. |
| 7,958,347 B1 | 6/2011 | Ferguson |
| 7,984,108 B2 | 7/2011 | Landis et al. |
| 8,005,953 B2 | 8/2011 | Miloushev et al. |
| 8,010,756 B1 | 8/2011 | Linde |
| 8,015,157 B2 | 9/2011 | Kamei et al. |
| 8,046,547 B1 | 10/2011 | Chatterjee et al. |
| 8,055,724 B2 | 11/2011 | Amegadzie et al. |
| 8,099,758 B2 | 1/2012 | Schaefer et al. |
| 8,103,622 B1 | 1/2012 | Karinta |
| 8,112,392 B1 | 2/2012 | Bunnell et al. |
| 8,117,244 B2 | 2/2012 | Marinov et al. |
| 8,171,124 B2 | 5/2012 | Kondamuru |
| 8,180,747 B2 | 5/2012 | Marinkovic et al. |
| 8,195,760 B2 | 6/2012 | Lacapra et al. |
| 8,204,860 B1 | 6/2012 | Ferguson et al. |
| 8,209,403 B2 | 6/2012 | Szabo et al. |
| 8,239,354 B2 | 8/2012 | Lacapra et al. |
| 8,271,751 B2 | 9/2012 | Hinrichs, Jr. |
| 8,302,100 B2 | 10/2012 | Deng et al. |
| 8,306,948 B2 | 11/2012 | Chou et al. |
| 8,326,798 B1 | 12/2012 | Driscoll et al. |
| 8,351,600 B2 | 1/2013 | Resch |
| 8,352,785 B1 | 1/2013 | Nicklin et al. |
| 8,392,372 B2 | 3/2013 | Ferguson et al. |
| 8,396,895 B2 | 3/2013 | Miloushev et al. |
| 8,397,059 B1 | 3/2013 | Ferguson |
| 8,400,919 B1 | 3/2013 | Amdahl et al. |
| 8,417,681 B1 | 4/2013 | Miloushev et al. |
| 8,417,746 B1 | 4/2013 | Gillett, Jr. et al. |
| 8,433,735 B2 | 4/2013 | Lacapra |
| 8,463,850 B1 | 6/2013 | McCann |
| 8,468,542 B2 | 6/2013 | Jacobson et al. |
| 8,548,953 B2 | 10/2013 | Wong et al. |
| 8,549,582 B1 | 10/2013 | Andrews et al. |
| 8,682,916 B2 | 3/2014 | Wong et al. |
| 8,725,692 B1 | 5/2014 | Natanzon et al. |
| 8,745,266 B2 | 6/2014 | Agarwal et al. |
| 8,954,492 B1 | 2/2015 | Lowell, Jr. |
| 9,020,912 B1 | 4/2015 | Majee et al. |
| 2001/0007560 A1 | 7/2001 | Masuda et al. |
| 2001/0047293 A1 | 11/2001 | Waller et al. |
| 2002/0035537 A1 | 3/2002 | Waller et al. |
| 2002/0059263 A1 | 5/2002 | Shima et al. |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0143909 A1 | 10/2002 | Botz et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0194342 A1 | 12/2002 | Lu et al. |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0065956 A1 | 4/2003 | Belapurkar et al. |
| 2003/0072318 A1 | 4/2003 | Lam et al. |
| 2003/0088671 A1 | 5/2003 | Klinker et al. |
| 2003/0128708 A1 | 7/2003 | Inoue et al. |
| 2003/0156586 A1 | 8/2003 | Lee et al. |
| 2003/0159072 A1 | 8/2003 | Belinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |

(56) References Cited

U.S. PATENT DOCUMENTS

| | | |
|---|---|---|
| 2004/0017825 A1 | 1/2004 | Stanwood et al. |
| 2004/0028043 A1 | 2/2004 | Maveli et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0093474 A1 | 5/2004 | Lin et al. |
| 2004/0098595 A1 | 5/2004 | Aupperle et al. |
| 2004/0133577 A1 | 7/2004 | Miloushev et al. |
| 2004/0133606 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0199547 A1 | 10/2004 | Winter et al. |
| 2004/0210731 A1 | 10/2004 | Chatterjee et al. |
| 2004/0213156 A1 | 10/2004 | Smallwood et al. |
| 2004/0236798 A1 | 11/2004 | Srinivasan et al. |
| 2005/0027862 A1 | 2/2005 | Nguyen et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0160243 A1 | 7/2005 | Lubbers et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213570 A1 | 9/2005 | Stacy et al. |
| 2005/0213587 A1 | 9/2005 | Cho et al. |
| 2005/0240756 A1 | 10/2005 | Mayer |
| 2005/0246393 A1 | 11/2005 | Coates et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0117048 A1 | 6/2006 | Thind et al. |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0200470 A1 | 9/2006 | Lacapra et al. |
| 2006/0206547 A1 | 9/2006 | Kulkarni et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0268932 A1 | 11/2006 | Singh et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0061441 A1 | 3/2007 | Landis et al. |
| 2007/0088702 A1 | 4/2007 | Fridella et al. |
| 2007/0128899 A1 | 6/2007 | Mayer |
| 2007/0136308 A1 | 6/2007 | Tsirigotis et al. |
| 2007/0139227 A1 | 6/2007 | Speirs et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0260830 A1 | 11/2007 | Faibish et al. |
| 2008/0046432 A1 | 2/2008 | Anderson et al. |
| 2008/0070575 A1 | 3/2008 | Claussen et al. |
| 2008/0114718 A1 | 5/2008 | Anderson et al. |
| 2008/0177994 A1 | 7/2008 | Mayer |
| 2008/0189468 A1 | 8/2008 | Schmidt et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0037500 A1 | 2/2009 | Kirshenbaum |
| 2009/0037975 A1 | 2/2009 | Ishikawa et al. |
| 2009/0041230 A1 | 2/2009 | Williams |
| 2009/0049260 A1 | 2/2009 | Upadhyayula et al. |
| 2009/0055507 A1 | 2/2009 | Oeda |
| 2009/0055607 A1 | 2/2009 | Schack et al. |
| 2009/0077097 A1 | 3/2009 | Lacapra |
| 2009/0077312 A1 | 3/2009 | Miura |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0161542 A1 | 6/2009 | Ho |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0265396 A1 | 10/2009 | Ram et al. |
| 2009/0313503 A1 | 12/2009 | Atluri et al. |
| 2010/0017643 A1 | 1/2010 | Baba et al. |
| 2010/0030777 A1 | 2/2010 | Panwar et al. |
| 2010/0061232 A1 | 3/2010 | Zhou et al. |
| 2010/0082542 A1 | 4/2010 | Feng et al. |
| 2010/0122248 A1 | 5/2010 | Robinson et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0325257 A1 | 12/2010 | Goel et al. |
| 2010/0325634 A1 | 12/2010 | Ichikawa et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0255537 A1 | 10/2011 | Ramasamy et al. |
| 2011/0296411 A1 | 12/2011 | Tang et al. |
| 2011/0320882 A1 | 12/2011 | Beaty et al. |
| 2012/0007239 A1 | 1/2012 | Kolics et al. |
| 2012/0042115 A1 | 2/2012 | Young |
| 2012/0078856 A1 | 3/2012 | Linde |
| 2012/0144229 A1 | 6/2012 | Nadolski |
| 2012/0150699 A1 | 6/2012 | Trapp et al. |
| 2012/0246637 A1 | 9/2012 | Kreeger et al. |
| 2013/0058225 A1 | 3/2013 | Casado et al. |
| 2013/0058252 A1 | 3/2013 | Casado et al. |
| 2014/0226666 A1 | 8/2014 | Narasimhan et al. |
| 2014/0372599 A1 | 12/2014 | Gutt et al. |

FOREIGN PATENT DOCUMENTS

| | | |
|---|---|---|
| CA | 2512312 A1 | 7/2004 |
| EP | 0605088 A2 | 6/1994 |
| EP | 0607088 A3 | 2/1996 |
| EP | 0738970 | 10/1996 |
| JP | 63010250 | 1/1988 |
| JP | 6205006 A3 | 7/1994 |
| JP | 060332782 | 12/1994 |
| JP | 821924 B2 | 3/1996 |
| JP | 08328760 | 12/1996 |

(56) References Cited

FOREIGN PATENT DOCUMENTS

| JP | 080339355    |    | 12/1996 |
| -- | ------------ | -- | ------- |
| JP | 9016510      | A  | 1/1997  |
| JP | 11282741     | A1 | 10/1999 |
| JP | 2000183935   | A3 | 5/2000  |
| NZ | 566291       | A  | 12/2008 |
| WO | 0239696      | A2 | 5/2002  |
| WO | 02056181     | A2 | 7/2002  |
| WO | 2004061605   | A2 | 7/2004  |
| WO | 2006091040   | A1 | 8/2006  |
| WO | 2008130983   | A1 | 10/2008 |
| WO | 2008147973   |    | 12/2008 |

OTHER PUBLICATIONS

Oracle Secure Backup Reference Release 10.1, B14236-01, Mar. 2006, pp. 1-456.

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004 Royal Holloway, University of London.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, Jun. 1990, pp. 1-4, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2003), pp. 864-873, XP010376176 ISBN: 0-7803-5880-5 p. 867, col. 2, last paragraph—p. 868, col. 1, paragraph 1.

Rosen E., et al., "MPLS Label Stack Encoding", (RFC:3032) Network Working Group, Jan. 2001, pp. 1-22, (http://www.ietf.org/rfc/rfc3032.txt).

RSYNC, "Welcome to the RSYNC Web Pages," Retrieved from the Internet URL: http://samba.anu.edu.ut.rsync/. (Retrieved on Dec. 18, 2009).

Savage, et al., "AFRAID—A Frequently Redundant Array of Independent Disks," Jan. 22-26, 1996, pp. 1-13, USENIX Technical Conference, San Diego, California.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

Soltis et al., "The Global File System," Sep. 17-19, 1996, in Proceedings of the Fifth NASA Goddard Space Flight Center Conference on Mass Storage Systems and Technologies, College Park, Maryland.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, pp. 1-4, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New Veritas Volume Management and File System Technology for Cluster Environments," Sep. 2001, VERITAS Software Corp.

Wang B., "Priority and Realtime Data Transfer Over the Best-Effort Internet", Dissertation Abstract, Sep. 2005, ScholarWorks@UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

Wilkes, J., et al., "The HP AutoRAID Hierarchical Storage System," Feb. 1996, vol. 14, No. 1, ACM Transactions on Computer Systems.

"Windows Clustering Technologies—An Overview," Nov. 2001, Microsoft Corp., www.microsoft.com, last accessed on Dec. 30, 2002.

Zayas, E., "AFS-3 Programmers Reference: Architectural Overview," Transarc Corp., version 1.0 of Sep. 2, 1991, doc. No. FS-00-D160.

"The AFS File System in Distributed Computing Environment," www.transarc.ibm.com/Library/whitepapers/AFS/afsoverview. html, last accessed on Dec. 20, 2002.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anonymous, "How DFS Works: Remote File Systems," Distributed File System (DFS) Technical Reference, retrieved from the Internet on Feb. 13, 2009:URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org<http://web.archive.org/web/20041123005335/developer.apple.com/macosx/tiger/spotlight.html>, pp. 1-6.

"A Storage Architecture Guide," Second Edition, 2001, Auspex Systems, Inc., www.auspex.com, last accessed on Dec. 30, 2002.

Basney et al., "Credential Wallets: A Classification of Credential Repositories Highlighting MyProxy," TPRC 2003, Sep. 19-21, 2003, pp. 1-20.

Botzum, Keys, "Single Sign on—A Contrarian View," Open Group Website, <http://www.opengroup.org/security/topics.htm>, Aug. 6, 2001, pp. 1-8.

(56) References Cited

OTHER PUBLICATIONS

Novotny et al., "An Online Credential Repository for the Grid: MyProxy," 2001, pp. 1-8.
Cabrera et al., "Swift: A Storage Architecture for Large Objects," In Proceedings of the-Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Microsoft Corporation, Nov. 2002.
"CSA Persistent File System Technology," A White Paper, Jan. 1, 1999, p. 1-3, http://www.cosoa.com/white_papers/pfs.php, Colorado Software Architecture, Inc.
"Distributed File System: A Logical View of Physical Storage: White Paper," 1999, Microsoft Corp., www.microsoft.com, <http://www.eu.microsoft.com/TechNet/prodtechnol/windows2000serv/maintain/DFS nt95>, pp. 1-26, last accessed on Dec. 20, 2002.
English Translation of Notification of Reason(s) for Refusal for JP 2002-556371 (Dispatch Date: Jan. 22, 2007).
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks," Jan. 2000, McGraw Hill, ISBN 0072120509.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring COMPCON, Santa Clara, CA, www.research.ibm.com, last accessed on Dec. 30, 2002.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
International Search Report for International Patent Application No. PCT/US 2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT /US02/00720, Jul. 8, 2004.
International Search Report from International Application No. PCT/US03/41202, mailed Sep. 15, 2005.
Karamanolis, C. et al., "An Architecture for Scalable and Manageable File Services," HPL-2001-173, Jul. 26, 2001. p. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers," 13Th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993. (http://www.ietf.org/rfc/rfc1510.txt?number=1510).
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, Summer 1994, vol. 7, pp. 333-359.
Modiano E., "Scheduling Algorithms for Message Transmission Over a Satellite Broadcast System," MIT Lincoln Laboratory Advanced Network Group, Nov. 1997, pp. 1-7.
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, Storage Networking Industry Association (SNIA), www.snia.org, last accessed on Mar. 26, 2001.

DEVICE FOR TOPOLOGY HIDING OF A VISITED NETWORK

This application claims the benefit of U.S. Provisional Patent Application Ser. No. 61/770,466 filed on Feb. 28, 2013, which is hereby incorporated by reference in its entirety.

FIELD

This technology relates generally to hiding a topology of a visited network. More particularly, this technology relates to hiding a topology of a visited network system when user equipment updates on change of location or other service related changes in the visited network or gets unsolicited notifications from its home network.

BACKGROUND

There are various solutions for hiding topology of network systems known in the art. However none of these solutions provides hiding of internal topology of networks for user equipment that is consuming visited network services.

SUMMARY

According to some examples of this technology, a system for hiding an internal topology of a network having plurality of client and server entities is provided herein. The system comprises a topology hiding node for coordinating communication between systems in two distinct networks: systems in Home Public Land Mobile (HPLM) networks and systems in Visited Public Land Mobile (VPLM) network. The topology hiding node includes long term storage and a short term storage which includes a change list.

According to some examples of this technology, a real identity of one system entity is represented by at least one virtual identity allocated from a group of at least two virtual identities. When communicating with other system entities, the relation between the virtual identities and the real identities of a current communication session is recorded in a change list and stored in short term storage and the relation between the virtual identities and the real identities of a previous communication sessions is stored in the long term storage.

This technology provides a system for hiding an internal topology of a network having plurality of client and server entities. The system comprises a topology hiding node for coordinating communication between systems in two distinct networks: systems in Home Public Land Mobile (HPLM) networks and systems in Visited Public Land Mobile (VPLM) network, includes a long term storage and a short term storage which includes a change list.

According to some examples of this technology a real identity of one system entity is hidden from external networks and represented by at least one virtual identity allocated from a group of at least two virtual identities when communicating with the other system entities.

According to some examples of this technology the relation between the virtual identities and the real identities of a current communication session is recorded in a change list which is stored in short term storage and the relation between the virtual identities and the real identities of a previous communication sessions is stored in the long term storage.

According to some examples of this technology the communication coordination is achieved by allocating mutually exclusive virtual H-MME from a list of virtual H-MME and sending it as origin host, when User Equipment (UE) just entered a new visited network and the IMSI does not exists in the THN at the exit of the visited network.

According to some examples of this technology in case UE did not enter a new visited network when transiting from one cell in the visited network to another cell in visited network the THN, then checking if the origin host is different from the one that is tracked in LTS, in case the origin host is different from the one that is tracked in LTS then the THN set a new origin host in IMSI record in LTS.

According to some examples of this technology the communication coordination is achieved by preparing a change List for the request using a record from LTS, storing it in STS, applying the change list on the real request and sending an update location request to HSS.

According to some examples of this technology, in case an outgoing message is sent from a UE that is moving from one cell to another in a visited network, retrieving a change list for IMSI from Short Term Storage (STS) and updating the change list in LTS According to some examples of this technology the change list is updated in STS.

According to some examples of this technology, in case an outgoing message is sent from a UE that just entered a visited network then, the THN retrieve IMSI from LTS and apply the change list on IMSI in the answer which was received from the HSS and sending said answer to the MME by the THN.

This technology provides a method for hiding an internal topology of a network having a plurality of client and server entities (MME) using a topology hiding node (THN). The method comprises coordinating communication between systems in two distinct networks: systems in Home Public Land Mobile (HPLM) networks; and systems in Visited Public Land Mobile (VPLM) network and includes a long term storage, a short term storage, and a change list. A real identity (IMSI) of one system entity is represented by at least one virtual identity allocated from a group of at least two virtual identities when communicating with the other system entities. The relation between the virtual identities and the real identities of a current communication session in the change list is recorded and stored in short term storage (STS), while the relation between the virtual identities and the real identities of a previous communication sessions is stored in the long term storage (LTS).

These, additional, and/or other aspects and/or advantages of this technology are: set forth in the detailed description which follows; possibly inferable from the detailed description; and/or learnable by practice of this technology.

BRIEF DESCRIPTION OF THE DRAWINGS

This technology will be more readily understood from the detailed description of examples thereof made in conjunction with the accompanying drawings of which.

DETAILED DESCRIPTION

Figure 1:
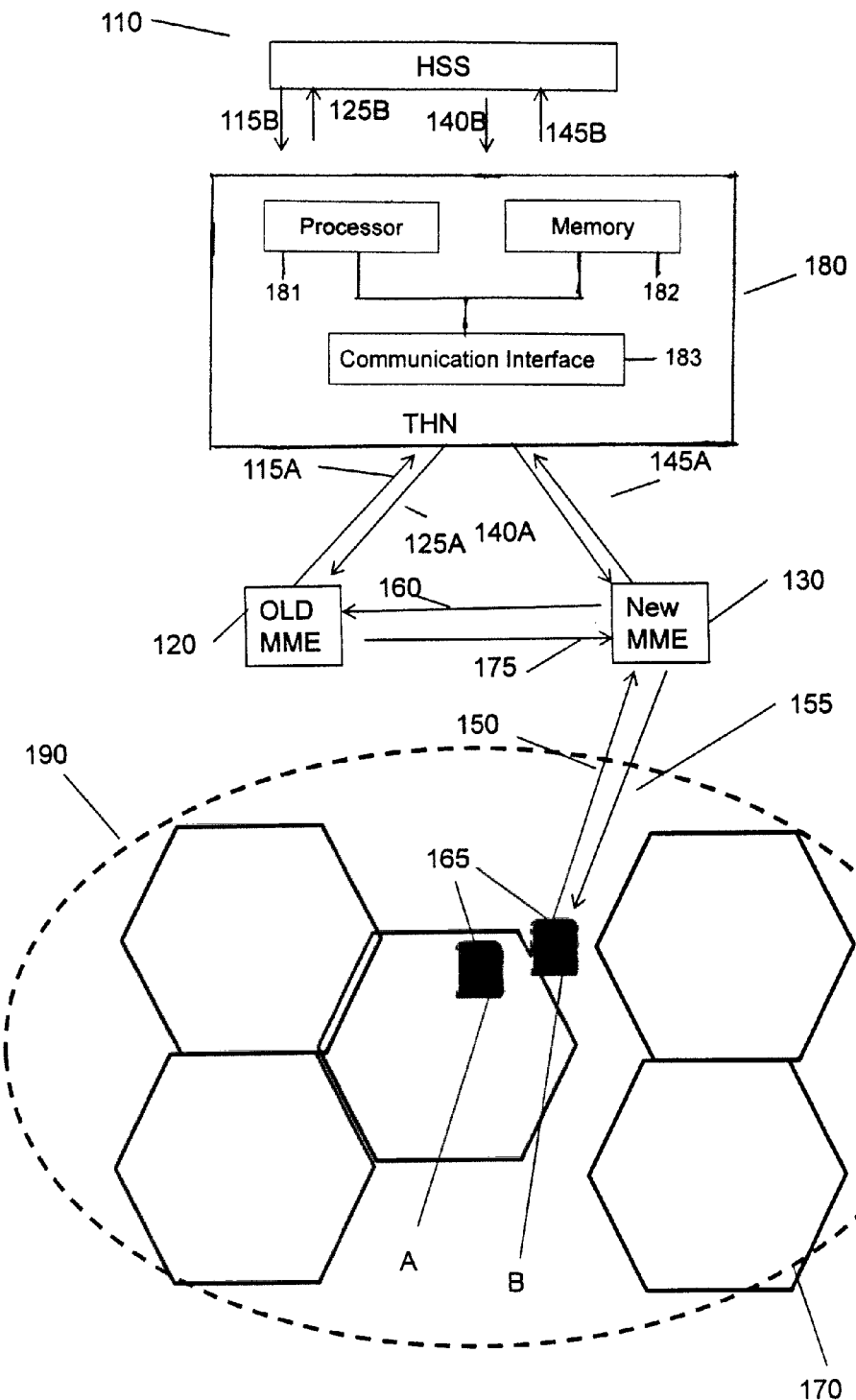
FIG. 1 illustrates a configuration of an EPC, showing connections and information flow between the following elements of the EPC: user equipment (UE) communicating with network of communication cell network, where mobility is managed by Mobile Management Entities (MME), and a Home Subscriber Server (HSS)

Before explaining at least one example of this technology in detail, it is to be understood that this technology is not limited in its application to the details of construction and the arrangement of the components set forth in the following description or illustrated in the drawings. This technology is applicable to other examples or of being practiced or carried out in various ways. Also, it is to be understood that the phraseology and terminology employed herein is for the purpose of description and should not be regarded as limiting.

The term "International Mobile Subscriber Identity (IMSI)" as used herein in this application, is defined as a unique identification of user equipment. Other methods for identification are applicable too.

The term "Topology Hiding Node (THN)" as used herein in this application, is defined as a computing device that is located in the exit of a visited network, or on the boundary between networks.

The term "Tracking Area (TA)" as used herein in this application, is defined as registration areas which are groups of cells in a radio network.

The term "Mobile Management Entity (MME)" as used herein in this application, is defined as an entity that among other things supports Tracking Area (TA) management and paging.

Evolved Packet Core (EPC) is the core network architecture of 4G Long Term Evolution (LTE). EPS provides operators ability to deliver broadband services.

EPC supports mobility procedure of User Equipment (UE) from one TA to another. A TA comprises a set of cells and a registration area in EPS is a list of one or more TAs.

FIG. 1 illustrates an example of a configuration of an EPC, showing connections and information flow between the following elements of the EPC: user equipment (UE) 165 communicating with network of communication cell network (190), where mobility is managed by Mobile Management Entities (MME) (130, 120), and a Home Subscriber Server (HSS) 110.

According to this technology it is suggested to locate an intermediary node: a Topology Hiding Node (THN) device 180 or other computing device or system at the exit of the visited network systems or the boundary between networks for intermediating between the HSS and MME entities located in different networks. The description is not limited to communication between MME and HSS and can extended to communication between PDN Gateway (PGW) and Policy Charging Ruling Function (PCRF) for policy push or pull, or between any pairwise combination of entities located at different networks.

Figure 2:
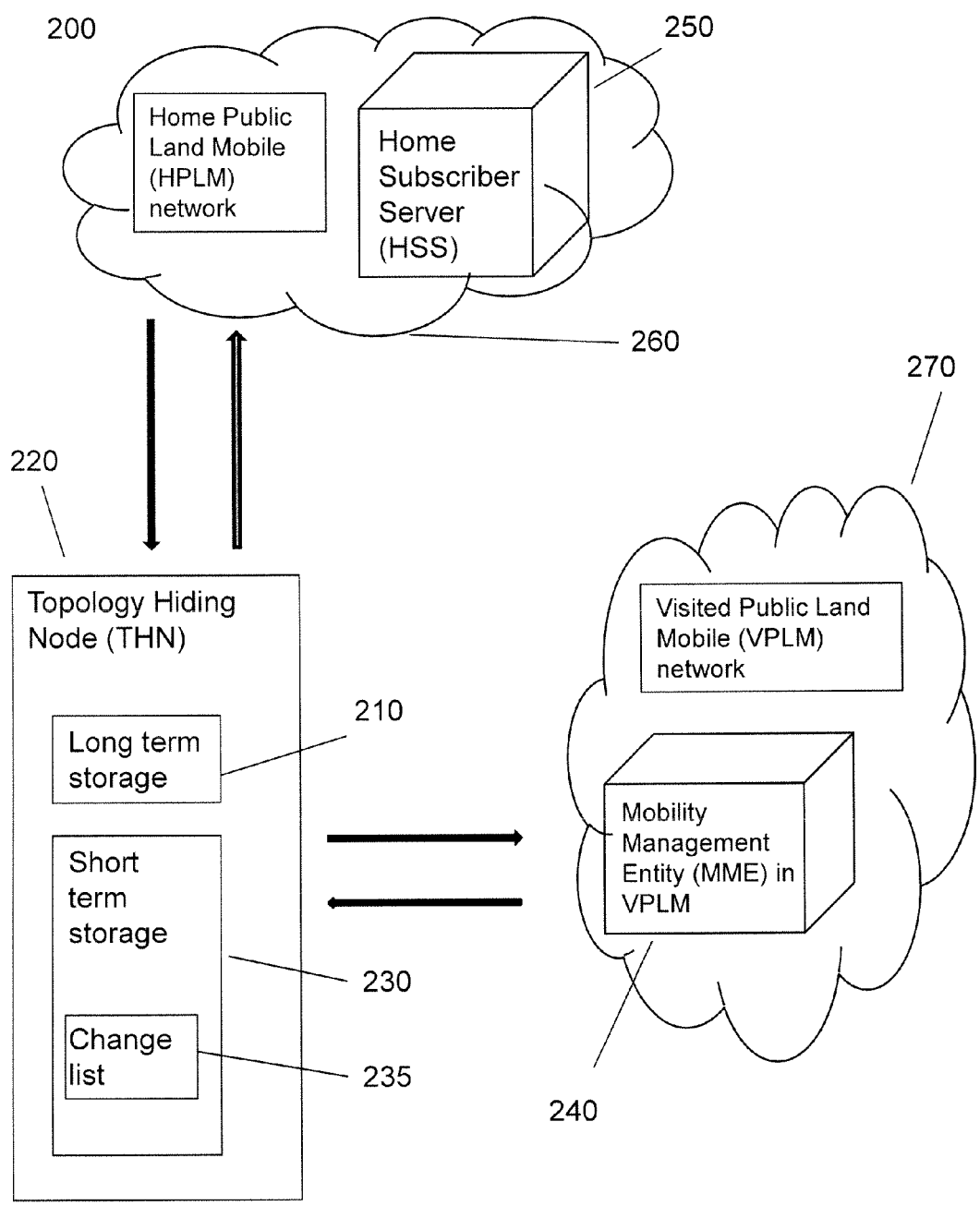
FIG. 2 is a block diagram of a THN device connected to a visited network, as illustrated in FIG. 1, according to some examples of this technology.

Referring more specifically to FIGS. 1-2, in this example the THN device 180 includes a processor 181, a memory 182, and a communication interface 183 which are coupled together by one or more buses or other links, although the THN device 180 may include other types and numbers of elements in other configurations.

The processor 181 of the THN device 180 may execute one or more programmed instructions stored in the memory 182 for hiding an internal topology of a network having plurality of client and server entities as illustrated and described in the examples herein, although other types and numbers of functions and/or other operation can be performed. The processor 181 of the THN device 180 may include one or more central processing units and/or general purpose processors with one or more processing cores, for example.

The memory 182 of the THN device 180 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 181, can be used for the memory 182.

The communication interface 183 of the THN device 180 operatively couples and communicates between the THN device 180 to other equipment, systems and/or devices, although other types and numbers of communication interfaces and connections and configurations to other equipment, systems and/or devices may be used.

According to some examples of this technology, a UE 165 performs TA update when the UE 165 is moving outside of a specified TA list. In other words, from one point A to another point B that is covered by different network cells. Additionally, the UE 165 performs TA update when the periodic TA update timer expires.

A TA update procedure starts with a TA update message (175) from old MME 120 to a new MME 130. When the new MME 130 receives the update message request (175), the new MME 130 checks if a context that is representing the connection of the UE to the mobile network for the UE 165 exists. If the context does not exist, then the MME 130 transmits request for context (160) to the old MME 120.

Context as mentioned in the application is referred to connectivity related context. Context may be for example, date, time, geographical localization and Quality of Service (QoS) metrics. This should not be limited to discussion on handover, other examples are applied too.

Figure 3A:
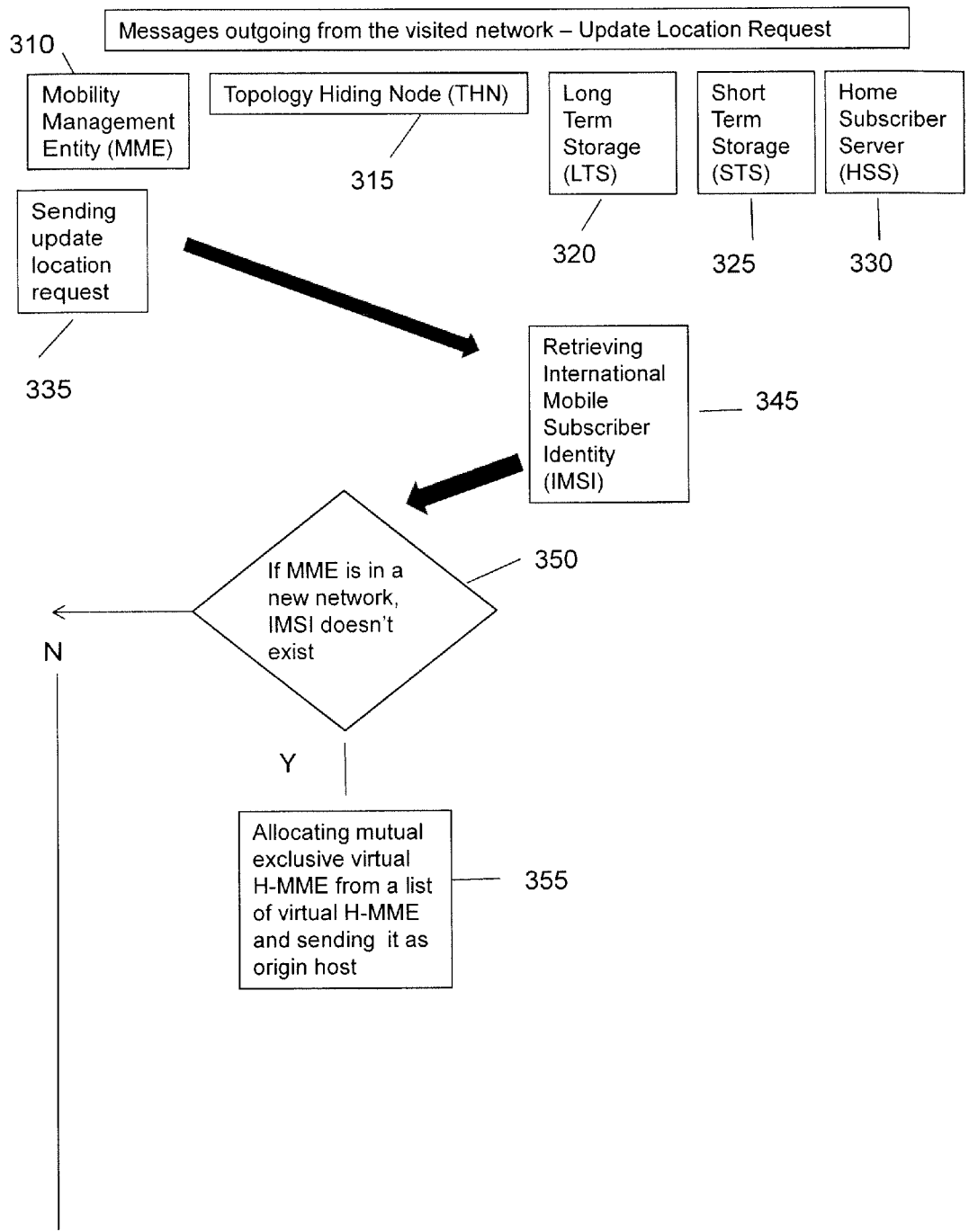
FIGS. 3A and 3B is a flow diagram of Topology Hiding Node (THN) 315 device activity when a message is going out of a visited network, according to some examples of this technology.
Figure 3B:
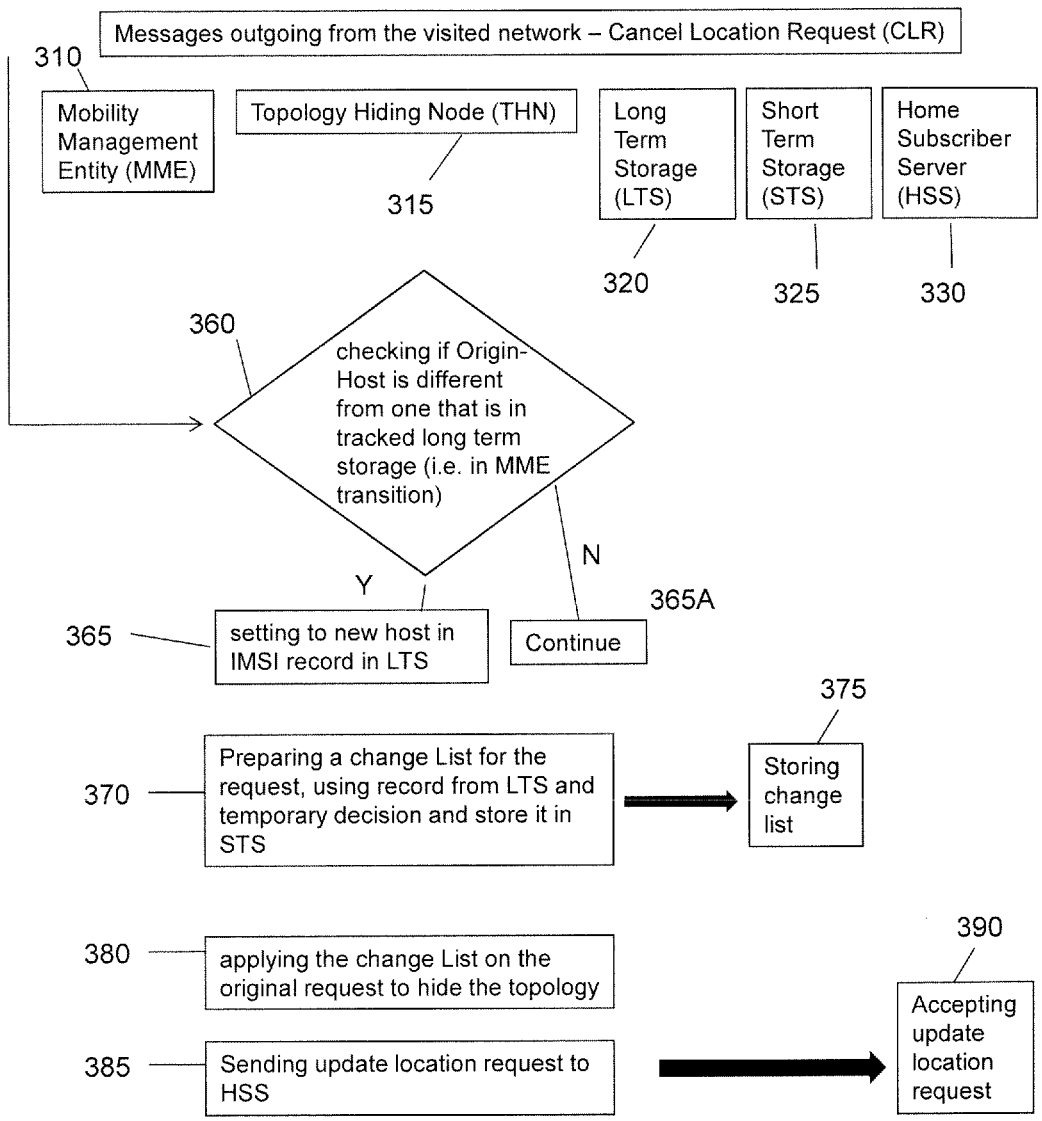

The old MME 120 transmits the context (160) of the UE 165 to the requesting new MME 130. Upon reception of the context (160), the new MME 130 sends a notification 145A that the context of the UE 165 has moved, to Home Subscriber Server (HSS) 110 via Topology Hiding Node (THN) 180, as illustrated in FIGS. 2, 3A and 3B.

Figure 4:
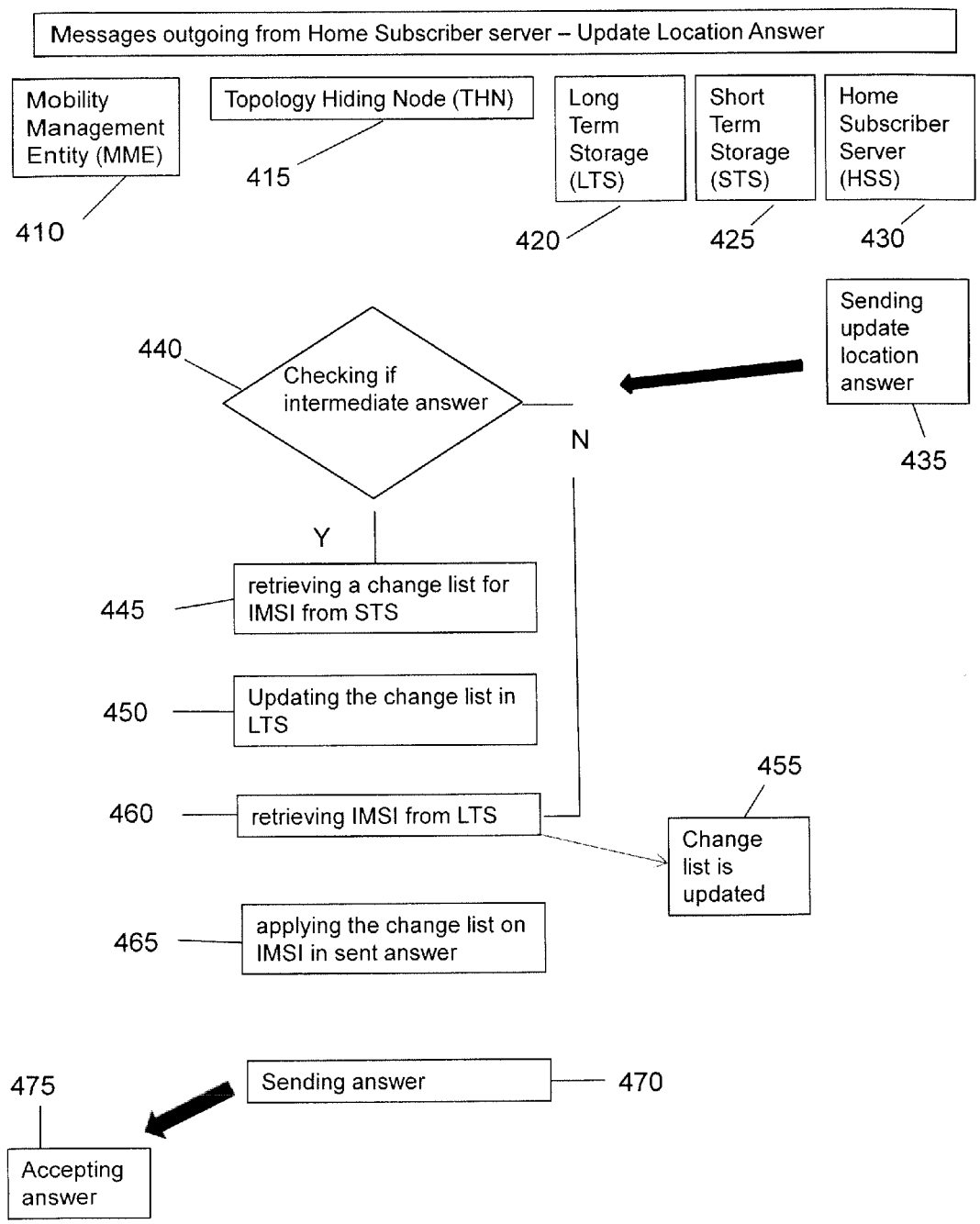
FIG. 4 is a flow diagram of second step of THN device activity when a message is going out of HSS, according to some examples of this technology.

According to some examples of this technology, the THN device 180 may process the notification and send it (145B) to HSS 110. After the HSS 110 cancels the context (115A-B), (125A-B) of the UE 165 in the old MME 120 via the THN device 180, the HSS 110 may acknowledge the new MME 130 and may insert new subscriber data of (140A-B) UE 165A in the MME 130 via the THN device 180 as illustrated in FIG. 4.

According to some examples of this technology, the data 140B may be transmitted from the THN device 180 after it is processed. At the final step the new MME 130 informs (155) the UE 165A that the TA procedure was successful.

In case the MME is in a visited network as illustrated later on in FIG. 2, during communication between MME in the visited network systems and HSS the security of the visited network systems may be compromised.

FIG. 2 is a block diagram of a THN device 220 device in connection with the visited network 270 and to a HSS 250, according to some other examples of this technology. In these examples, the THN device 220 is the same in structure and operation as the THN device 180, except as illustrated and described with reference to the examples herein.

According to an aspect of this technology, an intermediary device, i.e. the THN device 220, between the visited network 270 systems and home network 260 systems is provided to support internal topology hiding process of the visited network 270 systems from one hand, and to allow proper mobility management or other interaction procedure between network boundaries, e.g. Tracking Area Update (TAU) process, from the other hand. The intermediary device, i.e. the THN device 220, may be located at the exit of the visited network 270 systems. For messages outgoing from the visited network 270 systems, the THN device 220 may add, remove or update content, in a way that will hide information about a network element that generated the message.

According to some examples of this technology, the information about the network element that generated the message is hidden because it may compromise the security data of the visited network 270 systems and put the visited network 270 systems under risk of attack. Not only the internal topology may be hidden, but also the exact number of network elements in the visited network 270 systems may be masquerade. Any information can be hidden on user description.

According to another aspect of this technology, messages incoming to the visited network 270 systems from the home network 260 systems, may be routed by the THN device 220 to the correct network element. Since internal topology hiding process is applied, the message cannot be routed to its destination without a proper resolution which is also part of this technology.

According to yet another aspect of this technology, the THN device 220 may comprise a memory coupled to a processor to execute stored programmed instructions in accordance with the examples illustrated and described herein and the memory may include: (i) long term storage 210; and (ii) short term storage 230 including a change list 235, although other types and numbers of programmed instructions, modules, and/or other data, such as a change list by way of example, may be stored.

The relation between the virtual identities and the real (i.e. original) identities of a current communication session is recorded in the change list 135 which is stored in short term storage 230 and the relation between the virtual identities and the real identities of a previous communication sessions is stored in the long term storage 210.

FIGS. 3A and 3B are examples of flow diagrams of activity of a Topology Hiding Node (THN) 315 device when a message is going out of a visited network, according to some examples of this technology. In these examples, the THN device 315 is the same in structure and operation as the THN device 180, except as illustrated and described with reference to the examples herein.

According to an aspect of this technology, when a UE enters a visited network 270 in FIG. 2 or when the UE moves between cells in the visited network 270 in FIG. 2, MME 310 in visited network 270 may send an update message request to HSS 330 in Home Public Land mobile (HPLM) network 260 in FIG. 2 (stage 335). A subscriber's identity, such as International Mobile Subscriber Identity (IMSI), may be retrieved from Long Term Storage (LTS) 320 (stage 345). The LTS 320 may track HSS 330 and check which IMSI of a UE it is handling.

According to another aspect of this technology, in case the UE just entered a new visited network 270 in FIG. 2 the IMSI will not exist in the THN device 315 at the exit of the visited network 270 in FIG. 2 (stage 350). As a result, the THN device 315 may allocate mutually exclusive virtual H-MME from a list of virtual H-MME, such as virtual H-MME-1 and virtual H-MME-2 and send it as origin host instead of revealing details on network elements in the visited network (stage 355).

The real identity of each system entity is represented by at least one virtual identity allocated from a group of at least two virtual identities, when communicating with the HPLM systems.

According to yet another aspect of this technology, in case UE did not enter a new visited network 170 in FIG. 1 and it is in transition from one cell in the visited network 270 in FIG. 2 to another cell in visited network 270 in FIG. 2 meaning, the THN device 220 may check if origin host is different from the one that is tracked in LTS 320, (stage 360). If origin host is different from the one that is tracked in LTS 320, then THN device 315 may set new origin host in IMSI record in LTS (stage 365) for example.

The previous discussion is not limited to origin-host, other identifiers or combination of identifiers can be used. Next, the THN device 315 may prepare a change list for the message request by using a record from LTS 320 (stage 370) and store the change list in STS 325 (stage 375). Next, the THN device 315 may apply the change list on the real request to hide the topology of the visited network 270 systems in FIG. 2 (stage 380). Next, the THN device 315 may send an update location request to HSS 330 (stage 385) and the HSS 330 may accept the update location request (stage 390).

FIG. 4 is an example of flow diagram of a second step of THN device 415 device activity when a message is going out of HSS 430, according to some examples of this technology. In these examples, the THN device 415 is the same in structure and operation as the THN device 180, except as illustrated and described with reference to the examples herein.

According to an aspect of this technology, HSS 430 may send an update location answer 435 to MME in a visited network. Before a message from HSS 430 is going to MME in a visited network it passes via THN device 415. The THN device 415 may check if the message is intermediate, coming from a UE that just entered a visited network or a message from a UE that is moving from one cell to another in a visited network (stage 440).

In case of a CLR (Cancel-Location-Request), verifying that the Cancellation type is UPDATE-PROCEDURE, and the UE is moving between cells in a visited network then, the THN device 415 may retrieve a change list for IMSI from Short Term Storage (STS) (stage 445). Next, the THN device 415 may update the change list in LTS 425 (stage 450) and optionally updating change list in STS (stage 455).

According to another aspect of this technology, in case the message is not intermediate i.e. the UE is entering a visited network, then, the THN device 415 may retrieve IMSI from LTS 420 (stage 460). Next, the THN device 415 may apply the change list on IMSI on the answer that the HSS sent (stage 465). Next, the THN device 415 may send answer to the MME (stage 470) to be accepted by the MME 410 (stage 475).

In the above description, an example is an example or implementation of this technology. The various appearances of "one example", "an example" or "some examples" do not necessarily all refer to the same examples.

Although various features of this technology may be described in the context of a single example, the features may also be provided separately or in any suitable combination. Conversely, although this technology may be described herein in the context of separate examples for clarity, this technology may also be implemented in a single example.

Furthermore, it is to be understood that this technology can be carried out or practiced in various ways and that this technology can be implemented in examples other than the ones outlined in the description above.

This technology is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which this technology belongs, unless otherwise defined.

Additionally, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

This technology also may be embodied as a non-transitory computer readable medium having instructions stored thereon for one or more aspects of the present technology as described and illustrated by way of the examples herein, which when executed by the processor, cause the processor to carry out the steps necessary to implement the methods of this technology as described and illustrated with the examples herein.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A topology hiding node device comprising:
   at least one processor;
   at least one memory coupled to the processor configured to execute programmed instructions stored in the memory comprising:
   coordinating communication between entities in two networks comprising a Home Public Land Mobile (HPLM) network and a Visited Public Land Mobile (VPLM) network;
   representing a real identity of one the entities by at least one virtual identity allocated from a group of at least two virtual identities, when communicating with one or more of the other entities; and
   recording a relation between the virtual identity and the real identity of a current communication session in a change list stored in a short term storage (STS), while the relation between the virtual identity and the real identity of a previous communication sessions is stored in a long term storage (LTS).

2. The device of claim 1 wherein when the one the entities did not enter a new visited network when transiting from one cell in the visited network to another cell in visited network the processor is further configured to execute programmed instructions stored in the memory further comprising:
   checking when the origin host is different from the one that is tracked in the LTS; and
   setting a new origin host in a real identity record in the LTS when the origin host is different from the one that is tracked in the LTS.

3. The device of claim 1 wherein the processor is further configured to execute programmed instructions stored in the memory for the coordinating communication further comprises:
   preparing the change list for a request using a record from the LTS, storing the change list in the STS;
   applying the change list on the request; and
   sending an update location request to a Home Subscriber Server (HSS).

4. The device of claim 1, wherein in case an outgoing message is sent from the one the entities that is moving from one cell to another in a visited network the processor is further configured to execute programmed instructions stored in the memory for the coordinating communication further comprising:
   retrieving the change list for the real identity from the STS; and
   updating the change list in the LTS.

5. The device of claim 4 further comprising updating the change list in the STS.

6. The device of claim 1, wherein when an outgoing message is sent from the one the entities that just entered a visited network, the processor is further configured to execute programmed instructions stored in the memory for the coordinating communication further comprising,
   retrieving the real identity from the LTS;
   applying the change list on the real identity in an answer which was received from a Home Subscriber Server (HSS); and
   sending the answer to the Mobility Management Entity (MME).

7. A method for hiding an internal topology of a network, the method comprising:
   coordinating, with a topology hiding device, communication between entities in two networks comprising a Home Public Land Mobile (HPLM) network and a Visited Public Land Mobile (VPLM) network;
   representing, with the topology hiding device, a real identity of one the entities by at least one virtual identity allocated from a group of at least two virtual identities, when communicating with one or more of the other entities; and recording, with the topology hiding device, a relation between the virtual identity and the real identity of a current communication session in a change list stored in a short term storage (STS), while the relation between the virtual identity and the real identity of a previous communication sessions is stored in a long term storage (LTS).

8. The method of claim 7 wherein when the one the entities did not enter a new visited network when transiting from one cell in the visited network to another cell in visited network, then further comprising:
checking, with the topology hiding device, when the origin host is different from the one that is tracked in the LTS; and
setting, with the topology hiding device, a new origin host in a real identity record in the LTS when the origin host is different from the one that is tracked in the LTS.

9. The method of claim 7 wherein the coordinating communication further comprises:
preparing, with the topology hiding device, the change list for a request using a record from the LTS;
storing, with the topology hiding device, the change list in the STS; and
applying, with the topology hiding device, the change list on the request, and sending an update location request to a Home Subscriber Server (HSS).

10. The method of claim 7, wherein when an outgoing message is sent from the one of the entities that is moving from one cell to another in a visited network:
retrieving, with the topology hiding device, the change list for the real identity from the STS; and;
updating, with the topology hiding device, the change list in the LTS.

11. The method of claim 10 further comprising updating, with the topology hiding device, the change list in the STS.

12. The method of claim 7, wherein when an outgoing message is sent from the one of the entities that just entered a visited network:
retrieving, with the topology hiding device, the real identity from the LTS;
applying, with the topology hiding device, the change list on the real identity in an answer which was received from a Home Subscriber Server (HSS); and
sending, with the topology hiding device, the answer to the Mobility Management Entity (MME).

13. A non-transitory computer readable medium having stored thereon instructions for hiding an internal topology of a network comprising executable code which when executed by a processor, causes the processor to perform steps comprising:
coordinating communication between entities in two networks comprising a Home Public Land Mobile (HPLM) network and a Visited Public Land Mobile (VPLM) network;
representing a real identity of one the entities by at least one virtual identity allocated from a group of at least two virtual identities, when communicating with one or more of the other entities; and
recording a relation between the virtual identity and the real identity of a current communication session in a change list stored in a short term storage (STS), while the relation between the virtual identity and the real identity of a previous communication sessions is stored in a long term storage (LTS).

14. The medium of claim 13 wherein when the one the entities did not enter a new visited network when transiting from one cell in the visited network to another cell in the visited network, then further comprising:
checking when the origin host is different from the one that is tracked in the LTS; and
setting a new origin host in a real identity record in the LTS when the origin host is different from the one that is tracked in the LTS.

15. The medium of claim 13 wherein the coordinating communication further comprises:
preparing a change list for the request using a record from the LTS;
storing the change list in the STS; and
applying the change list on a real request, and sending an update location request to a Home Subscriber Server (HSS).

16. The medium of claim 13, wherein when an outgoing message is sent from the one of the entities that is moving from one cell to another in a visited network:
retrieving the change list for the real identity from the STS; and;
updating the change list in the LTS.

17. The medium of claim 16 further comprising updating the change list in the STS.

18. The medium of claim 13, wherein when an outgoing message is sent from the one the entities that just entered a visited network:
retrieving the real identity from the LTS;
applying the change list on the real identity in an answer which was received from a Home Subscriber Server (HSS); and
sending the answer to the Mobility Management Entity (MME).

* * * * *